United States Patent [19]

Momose et al.

[11] Patent Number: 5,392,214
[45] Date of Patent: Feb. 21, 1995

[54] CONTROL METHOD AND DEVICE FOR STEERING THE REAR WHEEL OF A VEHICLE

[75] Inventors: Nobuo Momose, Okazaki; Kiichi Yamada, Nagoya; Hiroaki Yoshida, Okazaki, all of Japan

[73] Assignee: Mitsubishi Jidosha Kogyo Kabushiki Kaisha, Tokyo, Japan

[21] Appl. No.: 985,149

[22] Filed: Dec. 3, 1992

[30] Foreign Application Priority Data

Dec. 3, 1991 [JP] Japan ..................... 3-319260

[51] Int. Cl.$^6$ .............................................. B62D 5/00
[52] U.S. Cl. ........................... 364/424.05; 180/79.1; 180/140; 180/142; 395/900
[58] Field of Search .................. 364/424.05; 180/79.1, 180/140, 141, 142, 143; 395/900

[56] References Cited

U.S. PATENT DOCUMENTS

| | | | |
|---|---|---|---|
| 4,809,175 | 2/1989 | Hosaka et al. | 364/424.01 |
| 4,834,205 | 5/1989 | Mizuno et al. | 180/141 |
| 4,964,481 | 10/1990 | Sano et al. | 180/140 |
| 5,020,619 | 6/1991 | Kanazawa et al. | 180/140 |
| 5,184,298 | 2/1993 | Imaseki et al. | 364/424.05 |
| 5,208,752 | 5/1993 | Kodama et al. | 364/424.05 |
| 5,229,955 | 7/1993 | Nishiwaki et al. | 364/424.05 X |
| 5,261,503 | 11/1993 | Yasui | 180/142 |

FOREIGN PATENT DOCUMENTS

| | | |
|---|---|---|
| 0278366 | 8/1899 | European Pat. Off. |
| 0379143 | 7/1990 | European Pat. Off. |
| 62-008871 | 1/1987 | Japan |
| 62-8871 | 1/1987 | Japan |
| 1190585 | 7/1989 | Japan |
| 02144261 | 6/1990 | Japan |
| 62-03007675 | 1/1991 | Japan |
| 9205994 | 1/1991 | WIPO |

OTHER PUBLICATIONS

Richard M. Tong, "An Annotated Bibihliography of Fuzzy Control," *Industrial Applications of Fuzzy Control*, Dec. 1985, pp. 249–269.

Lofti A. Zadeh, "Fuzzy Logic," *Computer*, Apr. 1988, pp. 83–92.

Chuen Chien Lee, "Fuzzy Logic in Control Systems: Fuzzy Logic Controler–Part I," *IEEE Transactions on Systems, Man, and Cybernetics*, vol. 20, No. 2, Mar. 1990, pp. 404–418.

*Primary Examiner*—Kevin J. Teska
*Assistant Examiner*—Collin W. Park

[57] ABSTRACT

Various steering coefficients (KB, KC, KG) are decided in accordance with a detected car speed (V), while a correction amount (X) and a correction factor (Y) are determined by fuzzy reasoning in accordance with a detected road surface friction coefficient ($\mu$), road surface gradient ($\alpha$), and lateral acceleration (G). A reference in-phase steering amount ($\delta$RB), equal to a product of a reference in-phase steering coefficient (KB) and a detected steering wheel angle ($\theta$H), is corrected by an in-phase correction steering amount ($\delta$RC), which is equal to a product of an in-phase steering coefficient (KC) and the detected steering wheel angle ($\theta$H), with a delay determined by a time constant (T) calculated from the correction amount (X), to thereby determine a corrected in-phase steering amount ($\delta$R). A corrected anti-phase steering amount ($\delta$G), obtained by multiplying a reference anti-phase steering amount ($\delta$GB), equal to a product of the anti-phase correction coefficient (KG) and a detected steering wheel angular velocity ($\theta$HA), by the correction factor (Y), is added to the corrected in-phase steering amount ($\delta$R), to thereby obtain a rear-wheel steering amount ($\delta$) on which the rear wheels are so steered as to match the road surface friction coefficient, road surface gradient, and lateral acceleration.

26 Claims, 7 Drawing Sheets

CONTROL METHOD AND DEVICE FOR STEERING THE REAR WHEEL OF A VEHICLE

BACKGROUND OF THE INVENTION

The present invention relates to a control method and device for steering the rear wheels of a vehicle, whereby the rear wheels are steered in accordance with the steering of the front wheels.

According to this type of rear-wheel steering control method, when a vehicle turns, the steering amount for the rear wheels, which matches the steering amount of the front wheels and the car speed, is determined so that the rear wheels are steered in the same phase as the front wheels according to the determined rear-wheel steering amount. Steering the rear wheels in the same phase in this manner makes it possible to improve the posture of the vehicle, i.e., the traveling stability at the time of turning.

In other words, when the rear wheels are steered together with the front wheels, the gripping power of the tires increases, thus leading to improved traveling stability of the vehicle.

The conventional common rear-wheel steering control method is, however, based on an assumption that a vehicle travels on a traveling road surface which is flat and whose road surface friction coefficient (road surface $\mu$) is large. This means that the rear-wheel steering amount is determined merely from the steering amount of the front wheels and the car speed.

Thus, in a case where a vehicle is traveling on a driving road with a smaller road surface $\mu$, what is called a "low-$\mu$ road," when the vehicle makes a turn, even if the rear wheels are steered in the same phase as the front wheels, the gripping power developed in the rear wheels will be insufficient because of the low road surface friction coefficient, resulting in deteriorated turning performance.

Also when a vehicle ascends or descends a slope, an appropriate steering amount of the rear wheels may not be obtained at the time of turning because of the longitudinal shifting of the load on the vehicle. To be more specific, when making a turn while descending a slope, the load on the rear wheels of the vehicle decreases, causing the gripping power of the rear wheels to decrease. This in turn causes the vehicle to develop rear-end shaking, and the turn of the vehicle shows an apparent oversteer tendency.

In contrast to the above, when the vehicle makes a turn while ascending a slope, the load on the rear wheels increases, and the gripping power of the rear-wheel tires increases more than necessary. As a result, the rear end of the vehicle comes to easily turn, and the turn of the vehicle shows an apparent understeer tendency.

Accordingly, the turning performance becomes unreliable when the driving road surface has a low $\mu$ or when a vehicle ascends or descends a slope. The unreliability increases especially when traveling on a low-$\mu$ road or descending a slope.

As prior examples focused on the aforementioned point, technologies for detecting the friction coefficient of a road surface and correcting the rear-wheel steering angle in a direction along which the influences exerted by the road surface friction coefficient is reduced have been disclosed in Japanese Patent Applications Laid-Open S60-148769 (DE3500793, GB2153311, FR255813, US4964481).

Also in Japanese Patent Applications Laid-Open S62-8871 and H1-190585 have disclosed technologies for correcting the ratio of a rear-wheel steering angle to a front-wheel steering angle in accordance with the gradient of a road surface.

In these prior examples, however, corrections are made merely in accordance with the friction coefficient of a road surface or the gradient of a road surface; therefore these prior technologies presented a problem in that sufficient corrections cannot be made in response to road surface conditions that change while a vehicle travels, thus failing to assure stable effect of the rear-wheel steering.

SUMMARY OF THE INVENTION

The present invention is based on the aforementioned circumstances, and its object is to provide a control method and device for steering the rear wheels of a vehicle whereby, when the vehicle makes a turn, a rear-wheel steering amount suited for the traveling condition is determined to ensure high traveling stability and also stabilized turning responsiveness even when the vehicle is traveling on a low-$\mu$ road or a slope.

To fulfill the aforementioned object, according to the present invention, a control method for steering the rear wheels of a vehicle is provided, which method comprises a first step wherein a 1 reference steering amount for the rear wheels is determined in accordance with the steering condition of the front wheels when the vehicle makes a turn, a second step wherein the rear-wheel steering amount is determined by correcting the aforesaid reference steering amount in accordance with the condition of the road surface on which the vehicle is traveling, and a third step wherein the rear wheels are steered in accordance with the rear-wheel steering amount. The aforesaid second step in the control method of the present invention comprises a fuzzy reasoning step wherein a plurality of fuzzy rules, which include the friction coefficient and surface gradient of a driving road surface as fuzzy variables, are established in advance, the levels of contribution of a driving condition, which is represented by the detected values of the road surface friction coefficient and road surface gradient, to the plurality of fuzzy rules are calculated, and at least one correction amount is determined according to correction values, which are respectively set in the rules in a manner that each rule includes at least one correction value concerned, and the levels of contribution; and a correction step wherein the reference steering amount is corrected in accordance with the correction amount.

According to the control method of the present invention, to correct the rear-wheel reference steering amount, the correction amount is determined from the road surface friction coefficient and road surface gradient according to the fuzzy reasoning, and the reference steering amount is corrected according to the correction amount, making it possible to perform proper correction under any road surface conditions, thus assuring stable turning performance.

It is possible to add a rule, which takes lateral acceleration applied to a vehicle into account, to the plurality of fuzzy rules used in the fuzzy reasoning step in the control method according to the present invention. In this case, more proper correction can be performed when a vehicle makes a sharp turn.

In addition, the control method according to the present invention can be applied to a control method wherein rear wheels are steered in the same phase as front wheels in accordance with the steering angle of the front wheels. In this case, corrections are made by adding a correction steering amount to a reference in-phase steering amount, and it is desirable to provide this addition with a time lag. By using this method, the in-phase steering amount can be corrected without sacrificing the turning responsiveness of a vehicle.

Further, it is possible to apply the control method according to this invention to both in-phase steering systems, wherein rear wheels are steered in the same phase as front wheels in accordance with the steering angle of the front wheels, and anti-phase systems, wherein rear wheels are steered in the opposite phase from front wheels in accordance with the steering angular velocity of the front wheels to instantaneously steer the rear wheels in the opposite phase in the early stage of steering. In this case, both in-phase steering components and instantaneous anti-phase steering components can be properly corrected. Therefore, both turning stability and turning responsiveness can be improved at a high level regardless of road surface conditions.

Other characteristics and advantages of the present invention will be made apparent from the following description of embodiment explained in connection with the accompanying drawings.

DETAILED DESCRIPTION FOR THE PREFERRED EMBODIMENTS OF THE PRESENT INVENTION

Figure 1:
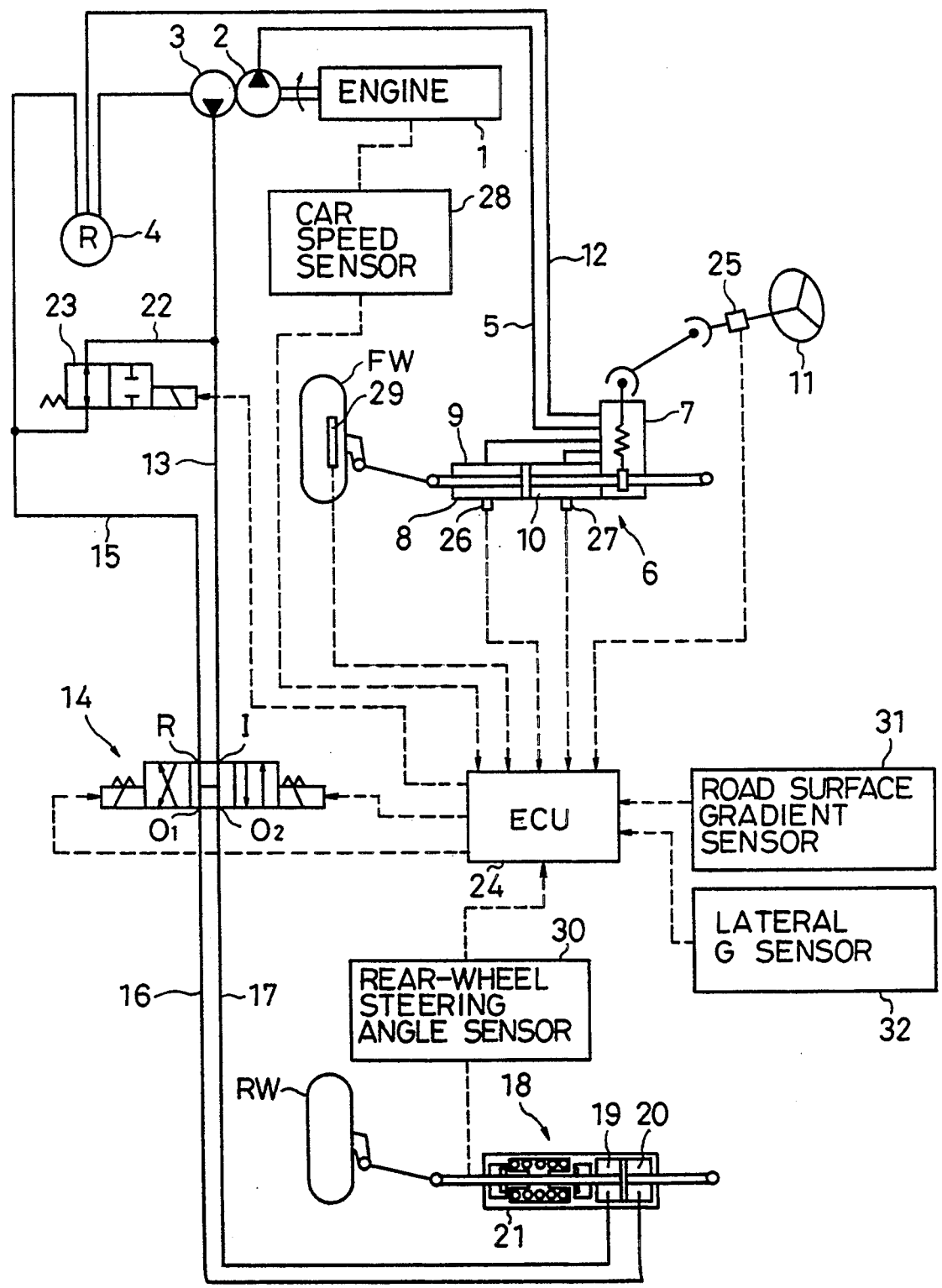
FIG. 1 is a schematic diagram which shows an embodiment of a 4-wheel steering system for the present invention.

Referring to FIG. 1, a 4-wheel steering (4WS) system of a vehicle is schematically illustrated. This 4WS system is equipped with tandem oil pumps 2 and 3 which are driven by an engine 1 of the vehicle, these tandem oil pumps 2 and 3 being connected to an oil reservoir 4.

One of the oil pumps or the oil pump 2 is connected to a power steering unit 6 via an oil supply line 5. More specifically, the oil supply line 5 is connected to a pair of pressure chambers 9 and 10 of a front-wheel power cylinder 8 via a steering control valve (not shown) which is built in a gear box 7 of the power steering unit 6. Both ends of the piston rod in the front-wheel power cylinder 8 are respectively linked to the right and left front wheels FW, but the drawing shows only the front-wheel FW on one side.

The steering control valve whose action is switched by operating a steering wheel 11 is operable to select the flowing direction of the oil to be supplied to the front-wheel power cylinder 8 in accordance with the steering direction of the steering wheel 11, thus permitting supply of the oil to a corresponding one of the pressure chambers of the cylinder. In addition, a return line 12 extends from the gear box 7, one end of the return line 12 being connected to the steering control valve while the other end being connected to the oil reservoir 4.

On the other hand, the oil pump 3 is connected to a rear-wheel hydraulic control valve 14 via an oil supply line 13. The rear-wheel hydraulic control valve 14 includes a 4-port, 3-position, electromagnetic directional control valve as illustrated, and the oil supply line 13 is connected to an input port I of the valve. A return port R of the rear-wheel hydraulic control valve 14 is connected to the oil reservoir 4 via the return line 15, a pair of output ports 01 and 02 thereof being connected to a rear-wheel power cylinder 18 via oil supply lines 16 and 17.

Thus, just like the front-wheel power cylinder 8, the rear-wheel power cylinder 18 has a pair of pressure chambers 19 and 20, the oil supply lines 16 and 17 being connected to these pressure chambers 19 and 20, respectively. Both ends of the piston rod of the rear-wheel power cylinder 18 are linked to the right and left rear wheels RW, and a centering spring 21 is incorporated in the rear-wheel power cylinder 18. This centering spring 21 energizes the piston rod to place the piston rod in the neutral position when the rear-wheel power cylinder 18 is not in operation, thus maintaining the straight-ahead advancement of the rear wheels RW.

Further, the aforesaid oil supply line 13 and the return line 15 are interconnected through a bypass line 22, and the bypass line 22 is provided with a hydraulic directional control valve 23 having an electromagnetic switching valve.

The rear-wheel hydraulic control valve 14 and the hydraulic directional control valve 23 each receive a command signal from an electronic control unit (ECU) 24 for their switching operation. To this end, the solenoids of the rear-wheel hydraulic control valve 14 and the hydraulic directional control valve 23 are electrically connected to the ECU 24.

Unless any electrical abnormality is detected by the ECU 24 or the power is off, the solenoid of the hydraulic directional control valve 23 is always excited by the ECU 24 to keep the hydraulic directional control valve 23 closed.

On the other hand, when one of the solenoids of the rear-wheel hydraulic control valve 14 is excited by the ECU 24, the rear-wheel hydraulic control valve 14 is switched from the neutral position illustrated to a corresponding one switching position. Accordingly, for the first time, the oil is supplied from the rear-wheel hydraulic control valve 14 to a corresponding one pressure chamber of the rear-wheel power cylinder 18 via an associated one of the oil supply lines 16 and 17, and the other pressure chamber is connected to the return line 15 via the other of the oil supply line 16 or 17, so that the rear-wheel power cylinder 18 is moved to one side. As a result, the rear wheels RW are steered by a specified rear-wheel steering amount.

The rear wheels RW are steered in the same phase as the front wheels FW, and the rear-wheel steering amount is decided by the ECU 24 according to the steering condition of the front wheels FW and the traveling condition of the vehicle.

In this connection, various types of sensors are electrically connected to the ECU 24. These sensors include a steering wheel angle sensor 25 for detecting a steering wheel angle $\theta H$ of a steering wheel, a pair of pressure sensors 26 and 27 for detecting the pressures in the pressure chambers 9 and 10, respectively, of the front-wheel power cylinder 8, a car speed sensor 28 for detecting a car speed from the revolutions of an output axle of a transmission (not shown) in the engine 1, a wheel velocity sensor 29 for detecting the wheel velocity of the front wheels FW, a rear-wheel steering angle sensor 30 for detecting an actual rear-wheel steering amount $\delta A$ of the rear wheels RW, a road surface gradient sensor 31 which detects the gradient of a traveling road surface, and a lateral G sensor 32 for detecting lateral acceleration (lateral G) applied to the vehicle.

As the rear-wheel steering angle sensor 30, a stroke sensor, for example, can be used, which detects the stroke of the piston rod in the rear-wheel power cylinder 18. Based on a sensor signal of the stroke sensor, the actual rear-wheel steering amount $\delta A$ can be determined by the ECU 24.

Regarding the road surface gradient sensor 31, it is difficult to actually detect the gradient of a traveling road surface; therefore, a clinometer for detecting the inclination of a car body can be used as the road surface gradient sensor 31, thus making it possible to detect the gradient of the road surface from a sensor signal issued by the clinometer.

In the case of this embodiment, the ECU 24 incorporates a detector circuit for detecting a road surface $\mu$ of the road surface on which a vehicle travels. Various methods are considered for detecting the road surface $\mu$. The detector circuit in this embodiment is designed to detect the road surface $\mu$ from the steering wheel angle $\theta H$ detected by the steering wheel angle sensor 25, the car speed V detected by the car speed sensor 28, and the pressure values detected by the pressure sensors 26 and 27 of the front-wheel power cylinder 8.

The principle of detecting the road surface $\mu$ is based on the following factors: first, the working pressure of the front-wheel power cylinder 8 is determined from a difference between the pressure values detected by the pressure sensors 26 and 27, respectively; second, the working pressure is proportional to the cornering force of the front wheels FW; third, the cornering force is proportional to the product of the side skid angle of the front wheels FW and the road surface $\mu$; and fourth, the side skid angle is represented in terms of the car speed V, the steering wheel angle $\theta H$, and the road surface $\mu$.

Further, in the case of this embodiment, the ECU 24 is capable of calculating the steering wheel angular velocity $\theta HA$ from a sensor signal received from the steering wheel angle sensor 25. More specifically, the steering wheel angular velocity $\theta HA$ can be calculated by the ECU 24 from the difference between a steering wheel angle $\theta H(n-1)$ detected previously and a steering wheel angle $\theta H(n)$ detected this time.

Figure 2:
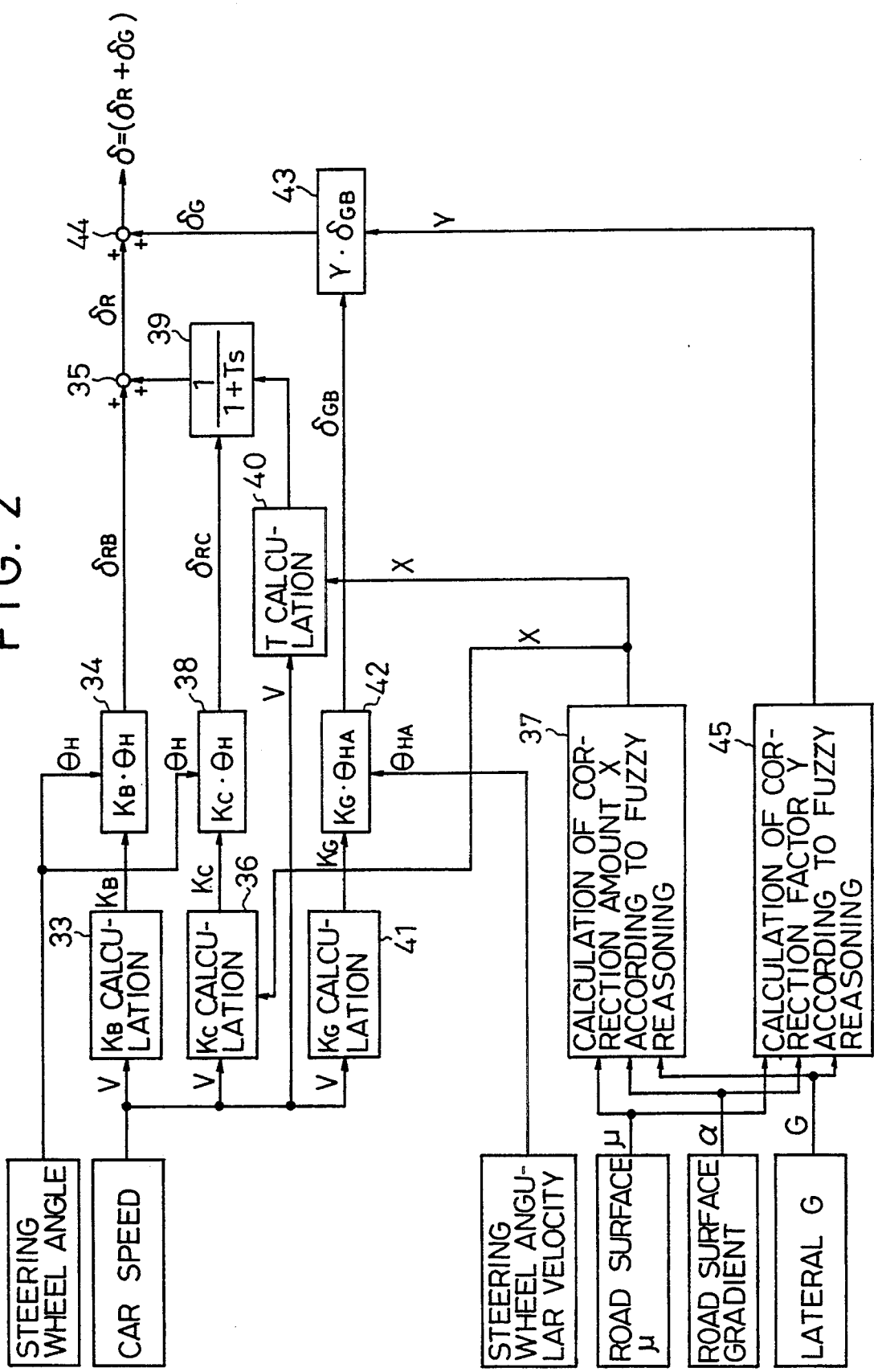
FIG. 2 is a block diagram which shows a procedure for calculating the steering amount for rear wheels in the control method for steering rear wheels according to an embodiment of the present invention, which is applied to the steering system of FIG. 1.

Next, referring to FIG. 2, a procedure for calculating the rear-wheel steering amount $\delta$ in the ECU 24 is shown in a block diagram. The following portion describes this calculating procedure.

First, the steering wheel angle $\theta H$, car speed V, steering wheel angular velocity $\theta HA$, road surface $\mu$, road surface gradient $\alpha$, and lateral G are all detected in the manner described above, then the car speed V is supplied to a block 33, and a reference in-phase steering coefficient KB is computed in this block 33. Here, the car speed V can be determined based on the sensor signal received from the aforesaid car speed sensor 28, but the car speed V can also be calculated from a sensor signal received from the wheel velocity sensor 29.

Figure 3:
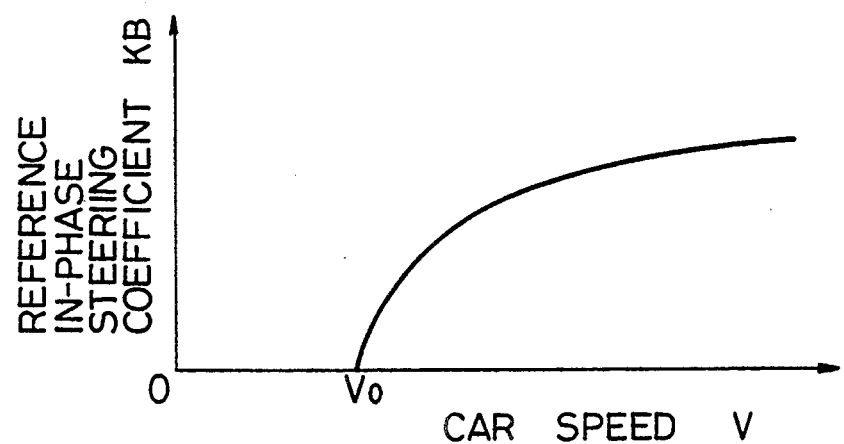
FIG. 3 is a graph which shows the relationship between a car speed and a reference in-phase steering coefficient used for calculating the steering amount for the rear wheels.

More specifically, to determine the reference in-phase steering coefficient KB according to the car speed V in the block 33, the graph shown in FIG. 3 can be used to calculate the reference in-phase steering coefficient KB. As shown in the graph of FIG. 3, the reference in-phase steering coefficient KB for the car speed V is determined beforehand. The reference in-phase steering coefficient KB is applied in a specified car speed range in which the car speed V is equal to or larger than a specified value V0 (e.g., 60 km/h), and KB is set so that it rapidly increases as the car speed V increases, while its increasing rate gradually reduces as the car speed V further increases until KB settles down to its maximum value.

The reference in-phase steering coefficient KB obtained in the block 33 is then supplied to a block 34. In this block 34, the reference in-phase steering amount $\delta RB$ of the rear wheels RW is determined by computation. Specifically, the steering wheel angle $\theta H$ in addition to the reference in-phase steering coefficient KB is supplied to the block 34. The reference in-phase steering amount $\delta RB$ of the rear wheels RW is the product of the reference in-phase steering coefficient KB and the steering wheel angle $\theta H$ and is calculated using the following formula:

$$\delta RB = KB \cdot \theta H$$

Accordingly, the reference in-phase steering amount $\delta RB$ obtained in the block 34 will increase as the steering wheel 11 is turned when the car speed V exceeds V0. After that, the reference in-phase steering amount $\delta RB$ is supplied to the adding unit 35.

The foregoing car speed V is also supplied to a block 36, and this block 36 also receives a first correction amount X from a block 37. Therefore, in the block 36, an in-phase correction steering coefficient KC is calculated based on the car speed V and the correction amount X. Specifically, the in-phase correction steering coefficient KC can be determined from the graph in FIG. 4.

Figure 4:
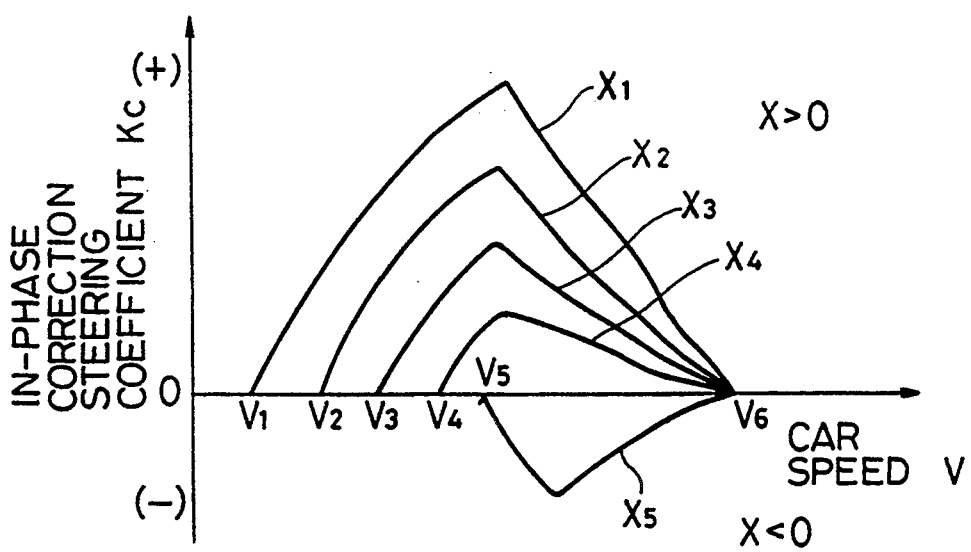
FIG. 4 is a graph which shows the relationship among the car speed, a correction amount X, and an in-phase correction steering coefficient used for calculating the steering amount for the rear wheels.

As shown in FIG. 4, the in-phase correction steering coefficient KC has a characteristic which draws, under a condition where the correction amount X takes positive values, an approximate triangular shape in which the in-phase correction steering coefficient KC gradually increases as the car speed V increases from a time point at which the car speed V reaches a certain car speed but gradually decreases as the car speed V further increases. In addition, this characteristic varies with the magnitude of the correction amount X, and as the correction amount X grows larger, the triangular shape of the characteristic grows larger. In other words, the relationship of the correction amounts X1, X2, X3, and X4 shown in FIG. 4 can be expressed, for example, by the following formula:

$$X1 > X2 > X3 > X4 > 0.$$

Here, the values, V1, V2, V3, and V4 of the car speed V, at which the in-phase correction steering coefficient KC starts to rise, decrease as the correction amount X increases, however, the in-phase correction steering coefficient KC becomes 0 regardless of the magnitude of the correction amount X when the car speed V reaches or exceeds V6.

Further, when the correction amount X takes negative values, i.e., in the case of the characteristic represented by X5, for example, the characteristic draws an inverted triangular shape in contrast to the triangular shape characteristic in which the correction amount X takes positive values. Accordingly, when the correction amount X is a negative value, the in-phase correction steering coefficient KC also takes a negative value.

In other words, the in-phase correction steering coefficient KC takes values other than a value "0," as long as the car speed V stays within a specified car speed range, while the in-phase correction steering coefficient KC takes the value "0" when the car speed V is outside the specified car speed range, and the in-phase correction steering coefficient KC carries the same sign as that of the correction amount X. Additionally, a lower limit car speed value that defines the specified car speed range decreases as the correction amount X increases.

In the meantime, the car speed values V1, V2, V3, V4, V5, and V6 shown in FIG. 4 are set, for example, to 20 km/h, 30 km/h, 40 km/h, 50 km/h, 60 km/h, and 100 km/h, respectively.

As previously mentioned, the correction amount X is calculated in the block 37. The road surface $\mu$, road surface gradient $\alpha$, and lateral G are supplied to the block 37, and the block 37 permits computation of the correction amount X from the road surface $\mu$, road surface gradient $\alpha$ and lateral G according to the fuzzy reasoning to be discussed later.

The in-phase correction steering coefficient KC computed in the block 36 is then supplied to a block 38 to calculate the in-phase correction steering amount $\delta$RC. Specifically, in the same manner as in the case of the foregoing block 34, the block 38 also receives the steering wheel angle $\theta$H, and the in-phase correction steering amount $\delta$RC is the product of the in-phase correction steering coefficient KC and the steering wheel angle $\theta$H. The in-phase correction steering amount $\delta$RC is calculated using the following formula:

$$\delta RC = KC \cdot \theta H$$

The in-phase correction steering amount $\delta$RC computed in this manner is supplied to the aforesaid adding unit 35, and by adding the in-phase correction steering amount $\delta$RC to the reference in-phase steering amount $\delta$RB in the adding unit 35, the rear-wheel in-phase steering amount (corrected in-phase steering amount) $\delta$R is calculated. The block 38, however, is not directly connected to the adding unit 35, but is connected to the adding unit 35 via a block 39 lying between them. This block 39 is a first-order low-pass filter whose transfer function is $1/(1+Ts)$, i.e., a first-order lag element (the symbol "s" denotes a Laplacean operator). In the case of this embodiment, a time constant T of the first-order lag element is supplied from the block 40. Specifically, in this block 40, the time constant T is calculated based on the car speed V and the foregoing correction amount X from the graph shown in FIG. 5. Therefore, the correction amount X calculated by the fuzzing reasoning in the block 37 described above is also supplied to the block 40.

Figure 5:
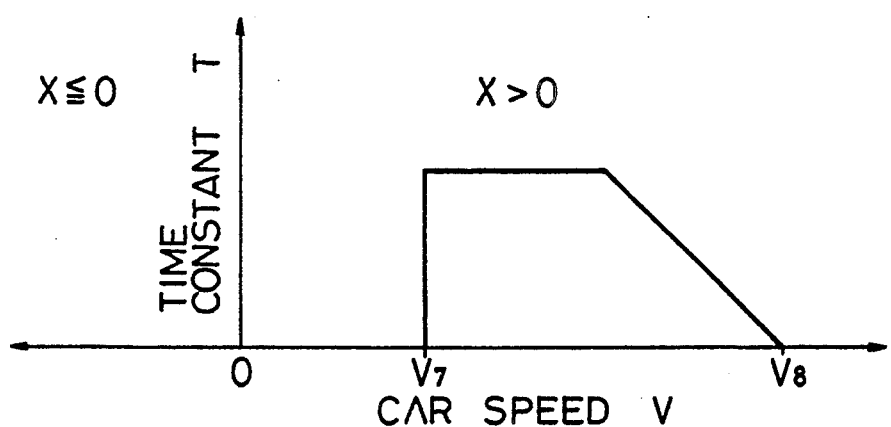
FIG. 5 is a graph which shows the relationship among the car speed, the correction amount X, and a time constant of the first-order lag element used for calculating the steering amount for the rear wheels.

As is obvious from FIG. 5, the time constant T takes a specified value as long as the correction amount X takes positive values and the car speed V stays in a specified speed range from V7 (e.g., 30 km/h), and the time constant T decreases as the car speed V deviates from the specified speed range and increases toward a car speed V8 (e.g., 80 km/h). Further, when the correction amount X takes a negative value, the time constant T unconditionally becomes "0."

Therefore, under a condition where the time constant T takes the specified value, the in-phase correction steering amount $\delta$RC calculated in the block 38 is supplied to the adding unit 35 with a specified lag due to the presence of the first-order lag element from the block 39. In addition, when the time constant T takes a positive value which is smaller than the specified value, a lag which is smaller than the specified lag results.

Figure 6:
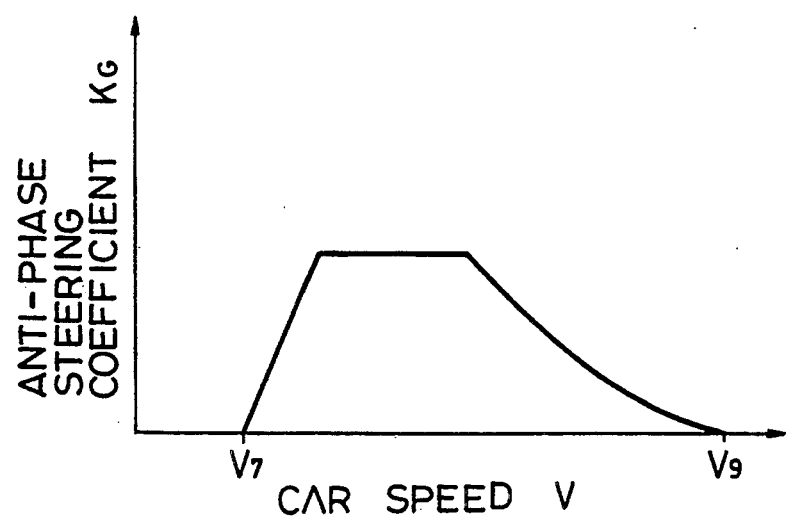
FIG. 6 is a graph which shows the relationship between the car speed and an anti-phase steering coefficient used for calculating the steering amount for the rear wheels.

Furthermore, the car speed V is supplied to a block 41 in addition to the aforesaid blocks 33 and 36. In this block 41, the anti-phase steering coefficient KG of the rear wheels RW is calculated. Specifically, in this case also, the anti-phase steering coefficient KG can be determined based on the car speed V from the graph of FIG. 6. As is obvious from FIG. 6, the anti-phase steering coefficient KG has a characteristic in which the anti-phase steering coefficient KG rapidly increases as the car speed V increases when the car speed V reaches or exceeds V7, and then maintains a constant value until a specified car speed is reached. After that, the anti-phase steering coefficient KG gradually decreases as the car speed V increases until it becomes 0 when the car speed reaches V9 (e.g., 125 km/h).

The anti-phase steering coefficient KG determined in the block 41 is supplied to the subsequent block 42 where a reference anti-phase steering amount $\delta$GB is calculated. This reference anti-phase steering amount $\delta$GB is the product of the anti-phase steering coefficient KG and the steering wheel angular velocity $\theta$HA. The reference anti-phase steering amount 67 GB can be calculated from the formula given below, and hence, the steering wheel angular velocity $\theta$HA is to be supplied to the block 42:

$$\delta GB = KG \cdot \theta HA.$$

The calculated reference anti-phase steering amount $\delta$GB is multiplied by a correction factor Y in the following block 43 to give a corrected anti-phase steering amount (rear-wheel anti-phase steering amount) d G, and this corrected anti-phase steering amount $\delta$G is supplied to an adding unit 44. This adding unit 44 receives a rear-wheel in-phase steering amount (corrected in-phase steering amount) $\delta R$ from the adding unit 35, and therefore, the adding unit 44 adds the rear-wheel in-phase steering amount $\delta R$ to the corrected anti-phase steering amount $\delta G$ to determine the final rear-wheel steering amount $\delta$. Thus, the rear-wheel steering amount $\delta$ is given by the following formula:

$$\delta = \delta R + \delta G.$$

It is needless to say that the corrected anti-phase steering amount $\delta G$ takes negative values in contrast to the rear-wheel in-phase steering amount $\delta R$.

Further, the corrected anti-phase steering amount $\delta G$ is calculated in accordance with the steering wheel angular velocity $\theta HA$, and therefore, its calculation responsiveness is better than that for the rear-wheel in-phase steering amount $\delta R$ which is computed based on the steering wheel angle $\theta H$.

Figure 9:
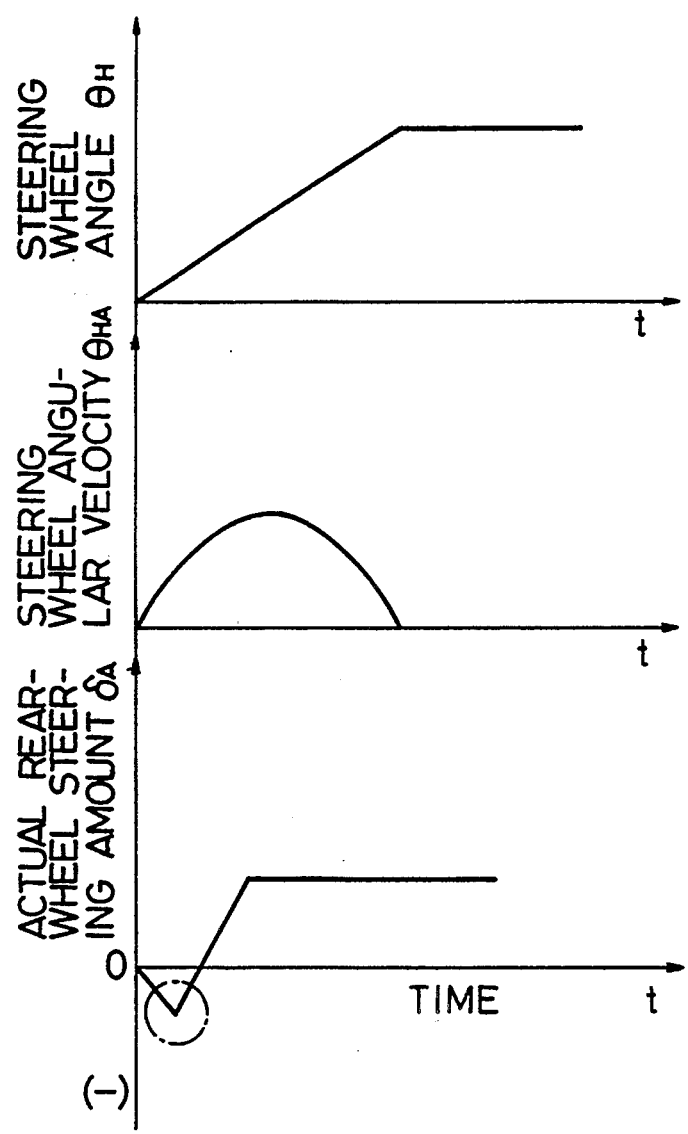
FIG. 9 is a graph which shows time-dependent changes in the steering wheel angle, steering wheel angular velocity, and actual rear-wheel steering amount.

Hence, when the rear-wheel steering amount $\delta$ is calculated in this a manner, the ECU 24 controls, in accordance with a sensor signal received from the rear-wheel steering angle sensor 30, the action of the foregoing rear-wheel power cylinder 18, i.e., the rear-wheel hydraulic control valve 14, so that the actual rear-wheel steering amount $\delta A$ coincides with the rear-wheel steering amount $\delta$. In an early stage of turning of a vehicle, the proportion occupied by the corrected anti-phase steering amount $\delta G$ in the rear-wheel steering amount $\delta$ is larger in comparison with the rear-wheel in-phase steering amount $\delta R$. After that, the proportion occupied by the rear-wheel in-phase steering amount $\delta R$ increases; therefore, the rear wheels RW will be instantaneously steered in the reverse phase in the early stage of the turn, as is apparent from a part indicated by the one-dot chain line in FIG. 9, and then will be steered in the same phase.

The correction factor (the second correction amount) Y of the aforesaid block 43 is supplied from a block 45. In a similar manner to the block 37, the block 45 receives the road surface $\mu$, road surface gradient $\alpha$, and lateral G, so that the correction factor Y is calculated from the road surface $\mu$, road surface gradient $\alpha$, and lateral G according to the fuzzy reasoning.

In this embodiment, therefore, the correction amount X and the correction factor Y are computed based on the same parameters for determining the vehicle traveling condition according to the fuzzy reasoning in the blocks 37 and 45, respectively.

A detailed description will now be given in relation to the implementation of the above-mentioned fuzzy reasoning.

To implement the fuzzy reasoning, nine fuzzy rules, which are described in the IF-THEN format, are established beforehand, as shown in the table below. In the table, the symbols, $\mu$, $\alpha$, and G denote the road surface friction coefficient, road surface gradient, and an absolute value of lateral acceleration (hereinafter referred to simply as "lateral acceleration"), respectively, which are the three items (fuzzy variables) of the antecedent of the fuzzy rules, while the symbols, xi and yi denote first and second correction values, respectively, as the two items of the consequent or conclusion of the fuzzy rules, with correction values xi and yi being used for calculating first and second correction amounts X and Y (to be discussed later). Further, each of the symbols S, M, B and A indicates the label which shows a fuzzy subset in a whole space or universe of discourse (carrier set) for a corresponding one of the road surface friction coefficient $\mu$, road surface gradient $\alpha$, and lateral acceleration G. The respective fuzzy sets are represented by membership functions to be discussed later.

In the table, the rule 1 (If $\mu = B$, $\alpha = S$ and $G = S$, then xi = x1 and yi = y2) means that "if the road surface friction coefficient $\mu$ is large, corresponding to the fuzzy set B, the road surface gradient is small, corresponding to the fuzzy set S, and the lateral acceleration G is small, corresponding to the fuzzy set S, then the correction value xi is set to the value x1 and the correction value yi is set to the value y1."

To put it briefly, the rule 1 defines that the correction values x1 and y1 are used if the traveling condition stays within the high road-surface friction coefficient range (high $\mu$ range), downward-pitch range, and low lateral acceleration range (low lateral G range). The following portion briefly describes the rules 2 through 9.

Rule 2: If the traveling condition is in the high-$\mu$ range, downward-pitch range, and high lateral G range, then the correction values x2 and y2 are used.

Rule 3: If the traveling condition is in the high-$\mu$ range, flat gradient range, and low lateral G range, then the correction values x3 and y3 are used.

TABLE

| Rule No. | Antecedent | | | Consequent | |
| --- | --- | --- | --- | --- | --- |
| | $\mu$ | $\alpha$ | G | xi | yi |
| 1 | B | S | S | x1 | y1 |
| 2 | B | S | B | x2 | y2 |
| 3 | B | M | S | x3 | y3 |
| 4 | B | M | B | x4 | y4 |
| 5 | B | B | S | x5 | y5 |
| 6 | B | B | B | x6 | y6 |
| 7 | S | S | — | x7 | y7 |
| 8 | S | M | — | x8 | y8 |
| 9 | S | B | — | x9 | y9 |

Rule 4: If the traveling condition is in the high-$\mu$ range, flat gradient range, and high lateral G range, then the correction values x4 and y4 are used.

Rule 5: If the traveling condition is in the high-$\mu$ range, upward-pitch range, and low lateral G range, then the correction values x5 and y5 are used.

Rule 6: If the traveling condition is in the high-$\mu$ range, upward-pitch range, and high lateral G range, then the correction values x6 and y6 are used.

Rule 7: If the traveling condition is in the low-$\mu$ range and downward-pitch range, then the correction values x7 and y7 are used regardless of the lateral G.

Rule 8: If the traveling condition is in the low-$\mu$ range and flat gradient range, then the correction values x8 and y8 are used regardless of the lateral G.

Rule 9: If the traveling condition is in the low-$\mu$ range and upward-pitch range, then the correction values x9 and y9 are used regardless of the lateral G.

In this embodiment, the correction values x1, y1; x2, y2; -x9, y9 are specified as follows: x1=1.0, y1=1.4; x2=0.6, y2=3.0; x3=0.0, y3=1.0; x4=−0.2, y4=2.5; x5=−0.8, y5=1.2; x6=−1.0, y6=2.7; x7=4.0, y7=3.0; x8=3.0, y8=2.5; and x9=2.0, y9=2.7.

Figure 7:
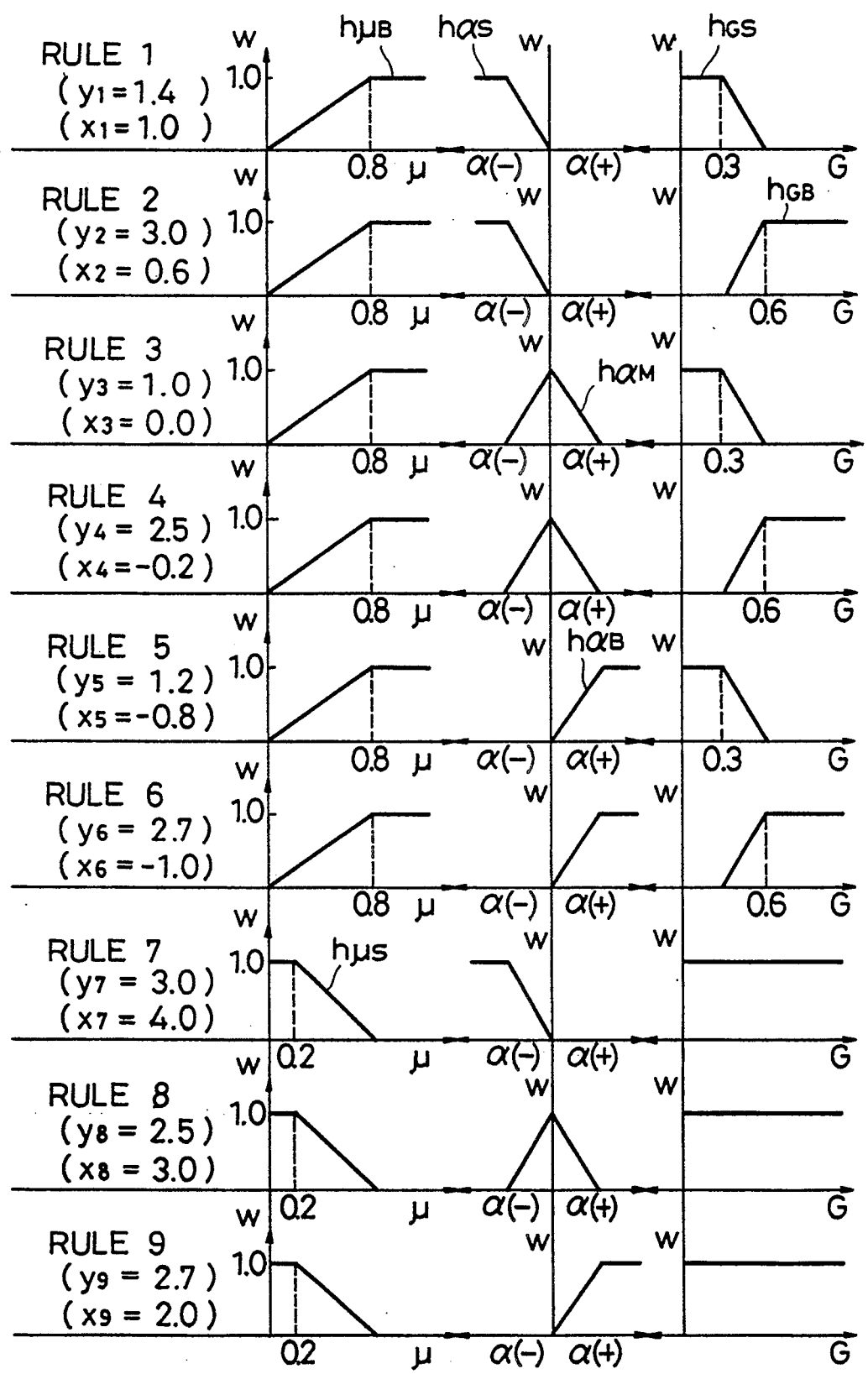
FIG. 7 is a map which shows the membership functions for each rule of fuzzy reasoning.

The membership functions h$\mu$B and h$\mu$S, which define the two fuzzy sets S and B, respectively, in the carrier set related to the road surface $\mu$, the membership functions h$\alpha$S, h$\alpha$M and h$\alpha$B which define the three fuzzy sets S, M and B, respectively, in the carrier set related to the road surface gradient $\alpha$, and the membership functions hGS and hGB which define the two fuzzy sets S and B in the carrier set related to the lateral acceleration G are established in advance as shown in FIG. 7 and stored in a memory.

Referring to FIG. 7, the membership function $h\mu S$ related to the road surface $\mu$ is set so that the level of contribution, i.e., the degree of conformity "w," takes 1.0 when the road surface $\mu$ stays between 0 and 0.2, while the level of contribution "w" decreases from 1.0 to 0 as the road surface $\mu$ increases from 0.2 to 0.8. Likewise, the membership function $h\mu B$ is set so that the level of contribution "w" increases from 0 to 1.0 as the road surface $\mu$ increases from 0 to 0.8, while the level of contribution "w" becomes 1.0 when the road surface $\mu$ is equal to or larger than 0.8.

The membership function $h\alpha S$ related to the road surface gradient $\alpha$ is set so that the level of contribution "w" takes 1.0 if the road surface has a downward pitch which is steeper than a specified downward pitch, while the level of contribution "w" decreases from 1.0 to 0 as the downward pitch of the road surface is less steep than the specified downward pitch (the level of contribution "w" becomes 0 on a flat road surface). The membership function $h\alpha M$ is set so that the level of contribution "w" increases from 0 to 1.0 as the downward pitch of the road surface grows gentler than the specified downward pitch, while the level of contribution "w" decreases from 1.0 to 0 as the upward pitch of the road surface grows to the specified upward pitch (the level of contribution "w" takes 1.0 on a flat road surface). Likewise, the membership function $h\alpha B$ is set so that the level of contribution "w" increases from 0 to 1.0 as the upward pitch of the road surface grows to the specified upward pitch, while the level of contribution "w" takes 1.0 when the road surface has an upward pitch which is steeper than the specified upward pitch (the level of contribution "w" becomes 0 on a flat road surface). In FIG. 7, $\alpha(+)$ denotes the upward pitch, while $\alpha(-)$ denotes the downward pitch.

Further, the membership function $hGS$ related to the lateral acceleration G is set so that the level of contribution "w" takes 1.0 as long as the lateral acceleration G stays within the range of 0 G to 0.3 G, while the level of contribution "w" decreases from 1.0 to 0 as the lateral acceleration G increases from 0.3 G to 0.6 G. The membership function $hGB$ is set so that the level of contribution "w" increases from 0 to 1.0 as the lateral acceleration G increases from 0.3 G to 0.6 G, while the level of contribution "w" becomes 1.0 if the lateral acceleration G is equal to or larger than 0.6 G. Furthermore, no membership function for the lateral G is specified in the rules 7, 8, and 9; therefore, the value of the membership function for the lateral G in these rules 7, 8, and 9 becomes 1 regardless of the value of the lateral G. In other words, if a traveling road surface has a low $\mu$, the turning performance of the vehicle unavoidably deteriorates, and therefore it is not necessary to consider the value of the lateral G under such a condition.

Thus, when the road surface $\mu$, road surface gradient $\alpha$, and lateral G are supplied to the block 37 for computing the first correction amount X, the values of the membership functions for respective rules "i," that is, the levels of contribution wxi, are calculated based on the supplied values. The correction amount X is the weighted mean of the correction values xi and the levels of contribution wxi associated with the respective rules "i". The correction amount is given by the following formula:

$$X = \Sigma xi \cdot wxi / (\Sigma wxi).$$

Similarly in the block 45 for calculating the correction factor (the 2nd correction amount) Y, the levels of contribution wyi associated with the respective rules "i" are calculated based on the values of the road surface $\mu$, road surface gradient $\alpha$, and lateral G. and the correction factor Y is calculated from the following formula:

$$Y = \Sigma yi \cdot wyi / (\Sigma wyi).$$

As the levels of contribution wxi and wyi for each rule "i," the minimum value of the values of membership functions associated with the rule "i" is adopted (wxi=wyi in this embodiment).

Figure 8:
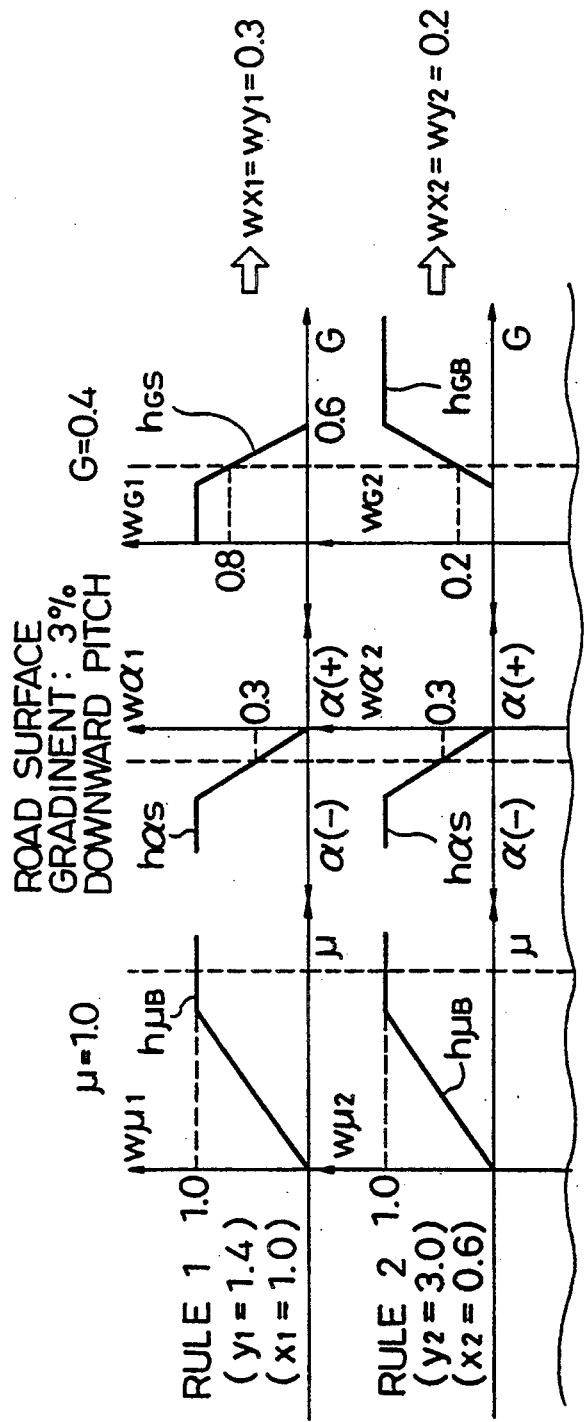
FIG. 8 is a diagram used to explain the calculation of the level of contribution determined from the membership functions for each rule.

Specifically, as shown in FIG. 8, if a traveling condition is detected, wherein the road surface $\mu$ is 1.0, the road surface gradient $\alpha$ is a 0.3% downward pitch, and the lateral G is 0.4, then the value (the level of contribution $w\mu 1$) of the membership function $h\mu B$ related to the road surface $\mu$ at $\mu = 1.0$ becomes 1.0, the value (the level of contribution $w\alpha 1$) of the membership function $h\alpha S$ related to the road surface gradient $\alpha$ at $\alpha = -0.3\%$ becomes 0.3, and the value (the level of contribution wG1) of the membership function hGS related to the lateral acceleration G at G=0.4 becomes 0.8. In this case, the level of contribution, i.e., the degree of conformity (wx1, wy1), of the detected traveling condition for the rule 1 will be the smallest value, 0.3, among the determined membership values 1.0, 0.3, and 0.8. Likewise, for the rule 2, the values of the membership functions $h\mu B$, $h\alpha S$ and hGB at $\mu=1$, $\alpha=-0.3\%$, and G=0.4, respectively, will be 1.0, 0.3, and 0.2, respectively; therefore, the levels of contribution wx2 and wy2 in the rule 2 will be both 0.2.

Thus, the levels of contribution wxi and wyi for the respective rules "i" are calculated as described above, and the correction amount X and correction factor Y can be calculated from the formulas shown above.

The graphs and membership functions of FIG. 3 through FIG. 7 are mapped and stored beforehand in a non-volatile memory (not shown) in the ECU 24. The values of the reference in-phase steering coefficient KB, in-phase correction steering coefficient KC, time constant T, anti-phase steering coefficient KG, and membership functions can be read from those maps.

According to the procedure for calculating the rear-wheel steering amount 6 described above, the correction amount X, which determines the in-phase correction steering amount $\delta RC$, and the correction factor Y, which determines the corrected anti-phase steering amount $\delta G$, are determined according to the fuzzy reasoning. This makes it possible to properly determine the rear-wheel steering amount 6 according to the vehicle traveling condition.

For instance, if a vehicle makes a turn under a traveling condition wherein the road surface $\mu$ of the traveling road surface is low and the traveling road surface is a downward slope or flat, then either rule 7 or 8 out of the rules described above applies to the correction amount X, and the correction amount X is mainly determined in accordance with the rule 7 or 8. Here, the correction values x7 and x8 of the rules 7 and 8, respectively, are set to values which are larger than the correction values of other rules; therefore, in this case, the correction amount X calculated will take a positive large value.

When the correction amount X is thus increased, the value of the in-phase correction steering coefficient KC accordingly grows larger as is obvious from the graph of FIG. 4, causing the in-phase correction steering amount δRC to increase. As a result, an attempt is made to correct the rear-wheel steering amount δ to significantly increase it toward the in-phase side. This means that the in-phase steering component of the rear-wheel steering amount δ is increasingly corrected.

Accordingly, under a condition where the road surface is slippery with a low surface road μ, the rear end of a vehicle shakes at the time of making a turn, thus causing oversteering during the turn, but the gripping power of the rear-wheel tires is enhanced by increasingly correcting the in-phase steering component of the rear-wheel steering amount δ, thereby canceling the oversteer to assure adequate traveling stability.

On the other hand, when the in-phase component of the rear-wheel steering amount δ grows larger, the head turning performance of the vehicle is deteriorated as previously mentioned. This problem can be solved by increasingly correcting the instantaneous anti-phase steering component of the rear-wheel steering amount δ in the early stage of the turn.

Under the above-mentioned traveling condition, either rule 7 or 8 applies also to the correction factor Y. The correction factors y7 and y8 of the rules 7 and 8 are set for 3.0 and 2.5, respectively; therefore, the correction factor Y will be a large value, and the corrected anti-phase steering amount δG determined from the product of the correction factor Y and the reference anti-phase steering amount δGB will be significantly and increasingly corrected. For this reason, at the time of making a turn, the instantaneous anti-phase steering component of the rear wheels RW at the early stage of the turn is increasingly corrected, for thereby assuring adequate head turning performance of the vehicle in the early stage of the turn.

Regarding the correction values x7 and x8 and the correction values y7 and y8 of the rules 7 and 8, respectively the values for the rule 7 are set larger than those for the rule 8 because the rear-wheel load decreases on a downward-pitch road surface with consequent larger reduction in the gripping power of the rear-wheel tires compared with that on a flat road.

Under a traveling condition where the traveling road is a low-μ, upward-pitch slope, the rule 9 applies to the correction amount X and correction factor Y. Also in this case, the in-phase correction steering amount δRC, i.e., the in-phase steering component of the rear-wheel steering amount δ is increasingly corrected, but the correction value x9 in the rule 9 is smaller than the correction values x7 or x8 of the rule 7 or 8; therefore, the in-phase steering component of the rear-wheel steering amount δ in this case is smaller than it would in a case where the road has a low μ and downward-pitch slope as previously described. In other words, in the case of an upward pitch, the rear-wheel load increases in contrast to the case of a downward pitch, and therefore, it is desirable that the in-phase steering component of the rear-wheel steering amount δ be decreased by that increase in the load.

Generally, in the case of an upward pitch, a vehicle tends to develop understeer when it makes a turn because of the increase in the rear-wheel load; therefore, a correction by increasing the in-phase steering component in the rear-wheel steering amount δ adds to the understeer. This problem can be solved by the instantaneous anti-phase steering component of the rear-wheel steering amount δ being increased in the early stage of the turn. More specifically, regarding the correction factor Y of the rule 9, the value of the correction value y9 is set for a value (2.7) which lies between the correction value in the rule 7 and the correction value in the rule 8; therefore, also in this case, the corrected anti-phase steering amount δG, i.e., the instantaneous anti-phase steering component in the early stage of the turn, is increasingly corrected by increasing the correction factor Y, which leads to enhanced head turning performance of the vehicle. This consequently permits sharp turning performance of the vehicle.

On the other hand, if the traveling road surface has a high μ and an upward pitch, then the rule 5 or 6 applies. The correction values x5 and x6 of the correction amount X in these rules 5 and 6 are both negative values, while the correction values y5 and y6 of the correction factor Y are positive values. Accordingly, under such a traveling condition, the correction amount X also becomes a negative value; therefore, the in-phase correction steering amount δRC also becomes a negative value, and the in-phase steering component of the rear-wheel steering amount δ is decreasingly corrected. Hence, under such a traveling condition, the aforesaid understeer tendency can be corrected by decreasing the in-phase steering component of the rear-wheel steering amount δ, and further, even in this case, the instantaneous anti-phase component of the rear-wheel steering amount δ is increasingly corrected, thus ensuring adequate head turning performance of the vehicle.

When the lateral G is considered under the traveling condition which is in conformity with the aforementioned rule 5 or 6, the rule 5 applies better when the lateral G is in a normal range, while the rule 6 applies better when the lateral G grows larger, and deviates from the normal range. The traveling condition which conforms to the rule 6 means a sharp turn of a vehicle; therefore in this case, as is obvious from the relationship in magnitude of a value between the correction values x5 and x6, and y5 and y6, the in-phase steering component of the rear-wheel steering amount δ is further decreasingly corrected, while the instantaneous anti-phase steering component is further increasingly corrected. As a result, the head turning performance of the vehicle is further enhanced, thus allowing stable turning to be implemented.

Further, if the traveling road is a high-μ, flat road, then either rules 3 or 4 applies. Also in the case of applying either rule 3 or 4, if the lateral G takes a large value deviating from the normal range and the vehicle takes a sharp turn, the rule 4 applies better. In this case also, the in-phase steering component of the rear-wheel steering amount δ is slightly and decreasingly corrected, while the instantaneous anti-phase steering component is increasingly corrected.

Under a traveling condition which conforms to the rule 3, the in-phase steering component of the rear-wheel steering amount δ is not corrected, and the anti-phase steering component is not corrected because the correction values x3 and y3 of the rule 3 are 0.0 and 1.0, respectively. This means that, in this case, the rear-wheel steering amount δ is the value obtained simply by adding the reference in-phase steering amount δRB and the reference anti-phase steering amount δGB.

Further, under a traveling condition where the traveling road has a high μ and a downward pitch, either rule 1 or 2 applies. In this case also, the in-phase steering component of the rear-wheel steering amount δ is slightly and increasingly corrected, while the anti-phase steering component is also increasingly corrected. When the lateral G is considered in this case, the in-phase steering component of the rear-wheel steering amount δ decreases, while the instantaneous anti-phase steering component increases when the lateral G is large because of the same reason as that in the case of the rules 3 and 4, or the rules 5 and 6.

In the case of the embodiment described above, as is obvious from the block diagram of FIG. 2, the calculated in-phase correction steering amount δRC is not immediately supplied to the adding unit 35, but calculated in-phase correction steering amount δRC goes through the first-order lag element of the block 39 before being supplied to the adding unit 35. Accordingly, as is obvious from FIG. 5, under a condition where the correction amount X takes a positive value and the car speed V lies between V7 and V8, the time constant T also takes a specified positive value; therefore, the in-phase correction steering amount δRC is added to the reference in-phase steering amount δRB with a specified time lag.

Thus, under a condition where the correction amount X is a positive value, that is, under a traveling condition where the in-phase steering component of the rear-wheel steering amount δ is increasingly corrected, especially a traveling condition which conforms to the rule 7 or 8, the reference in-phase steering amount δRB directly provides the rear-wheel in-phase steering amount δR in the early stage of the turning. This is advantageous in that the instantaneous anti-phase steering component of the rear-wheel steering amount δ is allowed to work effectively, for assuring adequate head turning performance of the vehicle, even if the steering wheel angular velocity is low when the steering wheel 11 is turned sharply under a traveling condition which conforms to either rule 7 or 8.

The present invention is not limited to the one embodiment described above but various modifications thereof may be made. For instance, in the above embodiment, the correction amount X and the correction factor Y are calculated according to the fuzzy reasoning, but other methods may be employed to calculate X or Y, and the X-based correction system or the Y-based correction system may be deleted. Further, in the above embodiment, the control method according to the present invention applies to a steering system which has an in-phase steering system and an instantaneous anti-phase steering system, but the method according to the present invention is also applicable to a steering system which has only the in-phase steering system or the instantaneous anti-phase steering system. The present invention is also applicable to a control system wherein the anti-phase steering is performed at low speeds, while the in-phase steering is performed at high speeds. Additionally, in the fuzzy reasoning, the handling of the lateral G is not limited to that in the above embodiment; it is needless to say that the method in accordance with the present invention can be implemented even if the lateral G is not considered, and the lateral G can be considered in various other ways. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling the steering of the rear wheels of a vehicle, comprising the steps of:
   (a) determining a reference steering amount of the rear wheels in accordance with a steering condition of the front wheels when the vehicle makes a turn;
   (b) correcting said reference steering amount in accordance with a condition of a road surface on which the vehicle is traveling to determine a rear-wheel steering amount;
   (c) steering the rear wheels according to said rear-wheel steering amount;
   said step (b) including the steps of:
   (d) establishing in advance a plurality of fuzzy rules, which include a friction coefficient and a gradient of a driving road as fuzzy variables;
   (e) calculating a plurality of first and second levels of contribution of a traveling condition, which is represented by detected values of said friction coefficient and said gradient for the surface of the driving road, to each of said plurality of fuzzy rules;
   (f) determining at least one correction amount based on correction values, which are respectively set in said fuzzy rules in a manner that each of said fuzzy rules includes at least one corresponding correction value, and said first and second levels of contribution to each of the respective fuzzy rules; and
   (g) correcting said reference steering amount in accordance with the at least one correction amount.

2. The method according to claim 1, further comprising the step of establishing each of said fuzzy rules by using a combination of a corresponding one of at least two fuzzy sets respectively associated with road surface friction coefficient ranges which include a high road surface friction coefficient range and a low road surface friction coefficient range, and a corresponding one of at least three fuzzy sets respectively associated with road surface gradient ranges which include a downward-pitch road surface gradient range, a flat road surface gradient range, and an upward-pitch road surface gradient range.

3. The method according to claim 1, wherein said plurality of fuzzy rules include a traveling condition rule to which traveling conditions corresponding to a high road surface friction coefficient range and a flat gradient range conform so that predetermined values of said correction value corresponding to said traveling condition rule is set to a value by which said reference steering amount fails to be corrected.

4. The method according to claim 1, wherein at least one of said plurality of fuzzy rules includes a lateral acceleration, which acts on the vehicle, as a fuzzy variable.

5. The method according to claim 4, wherein said plurality of fuzzy rules include first and second groups of rules, the levels of contribution of traveling conditions to said first and second groups of rules becoming equal when the traveling conditions are the same with respect to said friction coefficient and said gradient for the surface of the driving road so that first predetermined values of said correction values, given by said first group of rules to which group traveling conditions corresponding to a high lateral acceleration range conform are set to values by which said reference steering amount is shifted more to an anti-phase side as compared with second predetermined values of said correction values set in said second group of rules to which traveling conditions corresponding to a low lateral acceleration range conform.

6. The method according to claim 4, wherein said plurality of fuzzy rules include a group of rules to which traveling conditions corresponding to a low road surface friction coefficient range conform regardless of said lateral acceleration.

7. The method according to claim 1, wherein said step (a) includes the step of determining a reference in-phase steering amount, which is related to steering the rear wheels in the same phase direction as the front wheels, in accordance with a steering angle of the front wheels.

8. The method according to claim 7, wherein said steps (d)-(f) include the step of determining, according to said plurality of fuzzy rules, a first correction amount, which is used for correcting said reference in-phase steering amount and which serves as said at least one correction amount, on the basis of first correction values serving as said correction values set in the fuzzy rules, increasingly correcting said reference in-phase steering amount and setting one of said first correction values to a maximum by said plurality of fuzzy rules including a first traveling condition rule to which traveling conditions corresponding to a low road surface friction coefficient range and a downward-pitch road surface gradient range conform, and decreasingly correcting said reference in-phase steering amount and setting said two of first correction values to a minimum by said plurality of fuzzy rules including second traveling condition rules to which traveling conditions corresponding to a high road surface friction coefficient range and an upward-pitch road surface gradient range conform.

9. The method according to claim 7, wherein said step (d)-(f) includes the steps of determining, according to said plurality of fuzzy rules, a first correction amount, which is used for correcting said reference in-phase steering amount and which serves as said at least one correction amount, on the basis of first correction values, serving as said correction values set in the fuzzy rules, and setting one of said first correction values so that said one first correction value is greater than two of said first correction values set for one of said fuzzy rules to which traveling conditions corresponding to a high road surface friction coefficient range and a downward-pitch road surface gradient range conform by said plurality of fuzzy rules including a traveling condition rule to which traveling conditions corresponding to a low road surface friction coefficient range and an upward-pitch road surface gradient range conform.

10. The method according to claim 7, wherein said steps (d)-(f) include the steps of,
(i) determining a first correction which is used for correcting said reference in-phase steering amount and which serves as said at least one correction amount,
(ii) determining an in-phase correction steering amount on the basis of said first correction amount, and
(iii) adding said in-phase correction steering amount to said reference in-phase steering amount, to output a rear-wheel in-phase steering amount.

11. The method according to claim 10, wherein said step (iii) includes the step of detecting speed of said vehicle the step of multiplying an in-phase correction steering coefficient, which is obtained based on said first correction amount and said detected car speed, by said steering angle of the front wheels, to determine said in-phase correction steering amount.

12. The method according to claim 11, wherein said in-phase correction steering coefficient is set so that said in-phase correction steering coefficient takes values other than "0" as long as said vehicle speed stays within a specified car speed range and increases as said vehicle speed increases, but decreases as said vehicle speed further increases.

13. The method according to claim 12, wherein said specified car speed range is set so that a lower limit vehicle speed value which defines said specified vehicle speed range decreases as said first correction amount increases, for causing said in-phase correction steering coefficient to take values other than "0" at a lower vehicle speed as said first correction amount increases.

14. The method according to claim 11, wherein said in-phase correction steering coefficient is set such that said in-phase correction steering coefficient has the same sign as said first correction amount and said in-phase correction steering coefficient grows larger as said first correction amount increases.

15. The method according to claim 10, wherein said addition in said step (iii) is implemented with a specified time lag with respect to said step (ii).

16. The method according to claim 15, wherein said addition is carried out with said specified time lag only when said first correction amount has a sign which functions to correct said in-phase correction steering amount toward the in-phase steering side.

17. The method according to claim 15, wherein said specified time lag is set so that said specified time lag decreases as the vehicle speed increases in a range above a specified vehicle speed.

18. The method according to claim 10, wherein said step (a) includes the step of determining, in accordance with a steering angular velocity of the front wheels, a reference anti-phase steering amount which is related to steering the rear wheels in an opposite phase direction from the front wheels;

said steps (d)-(f) include the step of determining, according to said plurality of fuzzy rules, a second correction amount which is used for correcting said reference anti-phase steering amount and which serves as said at least one correction amount;

said step (g) includes the step of multiplying said reference anti-phase steering amount by said second correction amount obtained in said step (d)-(f), to determine a corrected anti-phase steering amount; and said steps (d)-(g) further includes the step of adding said correction anti-phase steering amount obtained in said step (g) to said in-phase steering amount, to determine said rear-wheel steering amount.

19. The method according to claim 1, wherein said steps (a)-(c) include the step of determining, in accordance with a steering angular velocity of the front wheels, a reference anti-phase steering amount, which is related to steering the rear wheels in an opposite phase from that of the front wheels.

20. The method according to claim 19, wherein said steps (d)–(f) include the step of determining, according to said plurality of fuzzy rules, a second correction amount, which is used for correcting said reference anti-phase steering amount and which serves as said at least one correction amount, on the basis of second correction values serving as said correction values set in the fuzzy rules;
wherein said plurality of fuzzy rules include first and second groups of rules, the levels of contribution of traveling conditions to the first and second groups of rules becoming equal when said traveling conditions are the same with respect to the friction coefficient for the surface of the driving road; and
wherein a first group of the first and second groups to which traveling conditions corresponding to an upward-pitch or downward-pitch road surface gradient range conform to provide a first predetermined of said second correction values which are greater than a second predetermined group of said second correction values set for the other one of said first and second groups of rules to which traveling conditions corresponding to a flat road surface gradient range conform.

21. The method according to claim 20, wherein said plurality of fuzzy rules include third and fourth groups of rules, the levels of contribution of traveling conditions to said third and fourth groups of rules becoming equal when these traveling conditions are the same with respect to the road surface friction coefficient;
wherein one group of said third and fourth groups to which traveling conditions corresponding to said downward-pitch road surface gradient range conform to provide a third predetermined group of second correction values which are greater than a fourth predetermined group of second correction values set for the other group of said third and fourth groups of rules to which traveling conditions corresponding to said upward-pitch road surface gradient range conform.

22. The method according to claim 19, wherein said steps (d)–(f) include the step of determining, according to said plurality of fuzzy rules, a second correction amount, which is used for correcting said reference anti-phase steering amount and which serves as said at least one correction amount, on the basis of second correction values serving as said correction values set in the fuzzy rules;
wherein at least one of said plurality of fuzzy rules includes the lateral acceleration, which works on the vehicle, as a fuzzy variable; and
wherein first predetermined ones of said fuzzy rules to which traveling conditions corresponding to a high lateral acceleration range conform or second predetermined ones of said fuzzy rules to which traveling conditions corresponding to a low road surface friction coefficient range conform provide a first predetermined group of said second correction values, which are greater than a second predetermined group of said second correction values which are set for third predetermined ones of said fuzzy rules to which traveling conditions corresponding to other conditions conform.

23. The method according to claim 19, wherein said steps (d)–(f) include the step of determining, according to said plurality of fuzzy rules, a second correction amount, which is used for correcting said reference anti-phase steering amount and which serves as said at least one correction amount; and
wherein said step (g) includes the step of multiplying said reference anti-phase steering amount by said second correction amount obtained in said steps (c)–(f), to determine a corrected anti-phase steering amount.

24. The method according to claim 1, wherein said step (a) includes the step of determining a reference in-phase steering amount which is related to steering the rear wheels in the direction of the same phase as the front wheels, in accordance with a steering angle of the front wheels, and determining a reference anti-phase steering amount which is related to steering the rear wheels in an opposite phase direction from the front wheels, in accordance with a steering angular velocity of the front wheels;
said step (d)–(f) include the step of determining first and second correction amounts which serve as said at least one correction amount;
said step (g) includes the step of correcting said reference in-phase steering amount and said reference anti-phase steering amount in accordance with said first and second correction amounts; and
said steps (d)–(g) further include the step of adding said corrected in-phase steering amount and said corrected anti-phase steering amount, to determine said rear-wheel steering amount.

25. The method according to claim 24, wherein said steps (d)–(f) include the steps of determining first and second correction values in accordance with said plurality of fuzzy rules common to said first and second correction values which are used for determining said first and second correction amounts and which correspond to said correction values set in the fuzzy rules; and
setting corresponding ones of said first and second correction values and each of said fuzzy rules independently from each other.

26. A device for controlling the steering of the rear wheels of a vehicle, comprising:
determining means for determining a reference steering amount of the rear wheels in accordance with a steering condition of the front wheels when the vehicle makes a turn;
correcting means for correcting said reference steering amount in accordance with a condition of a road surface on which the vehicle is traveling to determine a rear-wheel steering amount;
steering means for steering the rear wheels according to said rear-wheel steering amount; and
fuzzy reasoning means for establishing in advance a plurality of fuzzy rules, which include a friction coefficient and a gradient of a driving road as fuzzy variables, calculating a plurality of first and second levels of contribution of a traveling condition, which is represented by detected values of said friction coefficient and said gradient for the surface of the driving road to each of said plurality of fuzzy rules, and determining at least one correction amount based on correction values which are respectively set in said fuzzy rules in a manner that each of said fuzzy rules includes at least one corresponding correction value and said first and second levels of contribution to each of the respective fuzzy rules, said correcting means correcting said reference steering amount in accordance with the at least one correction amount.

* * * * *